United States Patent [19]

Weiler

[11] Patent Number: 4,617,765
[45] Date of Patent: Oct. 21, 1986

[54] WIPER BLADE EDGER

[75] Inventor: Robert M. Weiler, Feasterville, Pa.

[73] Assignee: Joe O'Donnell, Philadelphia, Pa. ; a part interest

[21] Appl. No.: 556,179

[22] Filed: Nov. 29, 1983

Related U.S. Application Data

[63] Continuation-in-part of Ser. No. 297,425, Aug. 26, 1981, abandoned.

[51] Int. Cl.$^4$ .......................................... B24D 15/02
[52] U.S. Cl. ................................. 51/205 WG; 76/83; 51/214; 51/383
[58] Field of Search ............. 51/205 WG, 205 R, 214, 51/392, 208, 210, 204, 370–371, 391, 382, 383, 385, 388; 24/615, 616, 625, 462, 460; 269/254 R, 48.1, 310; 76/82, 82.1, 82.2, 83, 88

[56] References Cited

U.S. PATENT DOCUMENTS

| | | |
|---|---|---|
| 460,380 | 9/1891 | McGarvey . |
| 493,174 | 3/1893 | McClure ................................. 76/83 |
| 502,932 | 8/1893 | Parsells . |
| 512,382 | 1/1894 | Knowles et al. .......................... 76/83 |
| 527,350 | 10/1894 | Taylor ....................................... 76/83 |
| 555,974 | 3/1896 | Roberts et al. ................ 51/205 WG |
| 838,268 | 12/1906 | Paschall . |
| 982,458 | 1/1911 | Andrews ............................ 76/83 X |
| 1,126,456 | 1/1915 | Harp . |
| 1,259,136 | 3/1918 | Rogers .............................. 51/205 R |
| 1,594,356 | 8/1926 | Davis . |
| 1,969,611 | 8/1934 | Jessen ..................................... 51/205 |
| 2,009,389 | 7/1935 | Anderson .............................. 51/205 |
| 2,042,916 | 6/1936 | Viozzi ................................... 51/205 |
| 2,052,543 | 9/1936 | Anderson .............................. 51/205 |
| 2,462,637 | 2/1949 | Haydon ................................. 51/211 |
| 3,336,699 | 8/1967 | Moberg ..................................... 51/3 |
| 3,528,204 | 9/1970 | McCue .................................... 51/173 |
| 3,585,760 | 6/1971 | Richmond ...................... 51/170 EB |
| 3,676,888 | 7/1972 | Akers ...................................... 15/245 |
| 3,708,924 | 1/1973 | Prunchak .......................... 51/205 R |
| 3,800,480 | 4/1974 | Keating ................................... 51/249 |
| 3,837,123 | 9/1974 | Bradbury ............................. 51/208 |
| 3,841,030 | 10/1974 | Laszlo ............................. 51/170 PT |
| 3,979,857 | 9/1976 | Kobylarz ....................... 51/109 BS |
| 4,028,160 | 6/1977 | Golumbic ............................ 156/98 |
| 4,097,951 | 7/1978 | Hurtt .................................. 15/104 S |
| 4,274,898 | 6/1981 | Hulting, Jr. .......................... 156/98 |
| 4,341,255 | 7/1982 | Mock .................................... 24/462 |

FOREIGN PATENT DOCUMENTS

| | | |
|---|---|---|
| 587881 | 12/1959 | Canada .................................. 76/83 |
| 609605 | 3/1979 | Fed. Rep. of Germany ........ 51/205 WE |
| 2266609 | 10/1975 | France ................................. 51/205 |
| 605743 | 7/1948 | United Kingdom .......... 51/205 WE |

Primary Examiner—Frederick R. Schmidt
Assistant Examiner—Debra S. Meislin
Attorney, Agent, or Firm—Steele, Gould & Fried

[57] ABSTRACT

An edger for manually refurbishing elastomeric wiper blades has a housing to be grasped by a user, the housing having a groove with rigid, non-abrasive sidewalls spaced substantially the same as the width of the working edge of the blade, and an abrasive member disposed in the housing at the bottom of the groove, the abrasive member aligned transverse to the groove to remove material from the blade transverse and perpendicular to the blade, effectively smoothing the blade as the edger is passed along its edge. The abrasive member may be mounted in the bottom of an inverted T-shaped slot, or the housing may include a slotted external member and an internal member defining a flat surface for supporting the abrasive member behind the slot.

3 Claims, 7 Drawing Figures

WIPER BLADE EDGER

CROSS-REFERENCE TO RELATED APPLICATION

This is a continuation-in-part of U.S. Patent Application Ser. No. 297,425, filed Aug. 16, 1981, now abandoned.

FIELD OF THE INVENTION

This invention relates to the field of refurbishing flexible elastomeric wiper blades which have working edges prone to nicks and cuts, and in particular to refurbishing windshield wiper blades, squeegees, flexible spreaders and the like.

PRIOR ART

Many products and tools in general use depend upon a smooth edge of one type or another in order to perform their intended function. These products include elastomeric devices as well as relatively rigid devices such as knife blades, axes, scissors, iceskates, scrapers and the like. Rigid devices may be impelled against a workpiece directly along the line defined by their edges (e.g., knives, iceskates), or perpendicular to the edge but substantially within the plane of the blade (e.g., axes, scrapers).

Elastomeric devices are intended to operate differently than rigid blades in that the resilience of the elastomeric blade, rather than its rigidity in the plane of the body of the blade, is the operative feature. Although such devices are also called "blades," elastomeric devices are moved transverse to the working edge and perpendicular to the plane defined by the blade. Windshield wipers, squeegees and the like are resiliently biased against a window or other surface to be treated, the resilience of the blade in that direction allowing it to conform to any misalignments or local surface defects.

Nicks or cuts in the surface of a rigid blade such as an axe will, of course, make it dull and less effective. With elastomeric blades, however, any nick or cut will defeat the entire smoothing or cleaning operation in that the transverse motion of a damaged blade leaves a line of untreated surface behind the nick or cut as the blade is moved over a surface.

It is, of course, desirable to avoid the necessity of entirely replacing an edged product such as an elastomeric blade which is slightly damaged. Nevertheless, the severe effect of relatively slight nicks and cuts, namely, the prominent and distracting streak left by a damaged windshield wiper blade, frequently makes such replacement necessary. Rigid blades such as knives and the like can be manually non-professionally sharpened using various available sharpening devices, although manual sharpening frequently leaves a blade having a surface which departs from the original smooth contour. In contrast, any departure from a smooth contour in an elastomeric blade used for transverse wiping will make the blade unusable in that streaks will only be aggravated.

Methods of refurbishing or repairing rubber or other elastomeric materials have heretofore been directed primarily to patching holes, filling dents and otherwise smoothing surfaces, rather than edges. U.S. Pat. No. 3,708,924-Prunchak is an exception in that a method and apparatus is disclosed for refurbishing wiper blades in which surface material is removed from an elastomeric blade of V-shaped cross-section using a V-shaped abrading surface. A handle extends perpendicularly from the V-shaped abrading surface for manipulating the device. As explained in the specification of that patent, such a device is useful for roughening the surfaces of the V-shaped body. It will nevertheless be appreciated that in order to correct a nick or cut in the extreme working edge of the blade, the conforming V-shaped cross-section of Prunchak makes it necessary to use the abrading device long enough to remove not only material at the working edge, but also material along the sides of the blade which rest against the converging sides of the device.

Devices in which a housing is used to support an abrasive member located at the bottom of a groove in the housing are known in connection with iceskate sharpeners. These devices are seldom elongated with respect to the blade, and require no particular structure to support the blade because the blade itself is rigid. Examples of such devices are disclosed in U.S. Pat. Nos. 3,841,030-Laszlo, 2,045,901-Viozzi, as well as in British Pat. No. 605,743-Allen and Swiss Pat. No. 609,605-Dusej. Inasmuch as the body to be sharpened is a steel blade, iceskate sharpeners need not maintain a lateral force against the blade to be sharpened. Similarly, alignment of the sharpener housing with the edge of the blade is no problem because the blade is flat and rigid and will withstand even extreme forces. Finally, iceskate blades are frequently hollow ground, that is, ground against a convex abrasive to form a concave working surface. Therefore, substantial rotation about the concavity will have no effect on the finished product. For this reason, the aforesaid Swiss patent discloses a supporting slot of noticeably wider diameter than the blade being sharpened, and the British patent discloses felt linings for the groove, which would necessarily allow some misalignment. The fact is that the rigidity of the blade to be sharpened supplies the necessary alignment of blade and abrading tool.

The sharpening of elastomeric bodies cannot be accomplished by use of a simple iceskate sharpening device. First, the elastomeric body to be sharpened comprises converging sides ending in a working edge of minimum diameter. In order to sharpen such a blade, some structure is required to support the blade during sharpening. Should a conforming V-shaped structure be used, such as that of Prunchak, a great deal of material must be removed in order to smooth out a shallow nick or cut at the edge. Moreover, such material must be removed while at all times maintaining the straight contour (or specific curved contour) of the elastomeric blade, to conform to the surface to be wiped.

According to the present invention, a slot of substantially the same width as the working edge is provided, together with an abrasive surface transverse to the slot, disposed at the bottom of the slot. The slot is only deep enough that some inward-force is necessary to bring the blade edge into contact with the abrasive. Inasmuch as the elastomeric blade is narrowest at the working edge, it must be squeezed into the slot, and is thereby supported. In use, the user removes material perpendicular to the plane of the blade, avoiding unnecessary removal of material from the sides of the blade's V-shaped contour. The downward force on the V-shaped blade causes a resultant force, whereby the non-abrasive sides of the slot tend to stiffen the elastomeric blade locally in the zone being abraded. The user's resiliently pressing the blade between the non-abrasive sidewalls of the slot thus compresses and aligns the blade, achieving the rigidity necessary to correctly and evenly remove only such material as necessary to pass the nick or cut.

SUMMARY OF THE INVENTION

It is an object of this invention to refurbish resilient wiper blades and the like, by removing material from their working edges subject to nicks and cuts.

It is also an object of the invention to provide an apparatus for such refurbishing in a form which is conveniently manually operable, and sufficiently inexpensive as to compare favorably to the cost of replacing the wiper blades.

It is another object of the invention to prolong the life of wiper blades by effectively refurbishing them one or more times.

It is still another object of the invention to refurbish a wiper blade without removing it from its associated operating structure.

It is yet another object of the invention to provide a method and apparatus for successively rigidifying incremental portions of a flexible wiper blade in order to evenly remove material from the working edge thereof by engagement with an abrasive member.

These and other objects are accomplished by an edger for manually refurbishing a wiper blade made of elastomeric material, the blade having a V-shaped cross-section of decreasing width to a working edge, the blade to be wiped transversely over a surface, the edger comprising: a housing to be grasped by a user, the housing having at least one groove along its length, the groove having rigid non-abrasive sidewalls, the groove having a width substantially the same as the working edge; and, an abrasive member disposed in the housing transverse to the groove, the abrasive member extending along the length of the housing, the abrasive member being aligned to remove material transverse and perpendicular to the blade as the edger is passed along the working edge, the groove maintaining a blade position perpendicular to the groove. The user applies a force on the blade inwards into the groove, causing a resultant force inwards on the sides of the blade, successively rigidifying and supporting portions of the elastic material subject to treatment.

The abrasive member may be placed in an inverted T-shaped slot, or the housing for the device may comprise inner and outer members, the outer member having a slot therein and the inner member serving to support the abrasive member. In a preferred embodiment, the housing comprises external portions and internal portions, the external portion being slotted and the internal portion having a U-shape in which the legs of the "U" engage inner surfaces of the external portion. Inward-facing ridges on the external portion may be provided for secure engagement with the internal portion.

BRIEF DESCRIPTION OF THE DRAWINGS

There are shown in the drawings the embodiments which are presently preferred. It should be understood, however, that the invention is not limited to the precise arrangements and instrumentalities shown in the drawings, wherein.

DETAILED DESCRIPTION OF THE PREFERRED EMBODIMENTS

In order to successively refurbish a wiper blade, the restored working edge along the entire length of the blade must be made substantially flat and even. Although it is certainly possible to use a simple piece of sandpaper or even a cutting blade to remove material from the area of a nick or cut, such action will fail to provide satisfactory results. Unless material is also removed even from undamaged areas of the blade, removal of any material merely serves to enlarge the nick or cut. Therefore, unless material is evenly removed from the entire length of the blade, progressing parallel to the working edge, the supposedly refurbished blade will become virtually unusable, rather than merely inefficient, inconvenient or distracting in that it leaves a streak.

It may be thought possible to employ a surface-conforming V-shaped sandpaper, or to provide a concave abrasive surface such that the effect of misalignment of the abrading tool with respect to the plane of the blade will be minimized. In fact, such a device will not work adequately. The elastomeric nature of windshield wiper blades and the like causes the engaged portion of the resilient blade to locally deform within the abrading tool, and to deform particularly adjacent the edges of the tool. Accordingly, the device of the invention is designed to accomplish a method of refurbishing wiper blades, including steps of successively confining and rigidifying elongated, but otherwise incremental lengths of the blade in a narrow guide channel. The guide channel is non-abrasive and temporarily rigidifies the incremental lengths within the channel, thereby aligning the blade and tool. An abrasive surface is simultaneously applied perpendicularly to the plane of the blade and transverse to the working edge, whereby the working edge is not sharpened, but is flattened, progressing inwards from its point of medium diameter.

The apparatus according to the invention includes a guide channel which is preferably straight. An overall curved working edge could be provided in special instances; however, in the preferred embodiment, the abrasive material is flat and the channel straight and smooth. In any event, it is necessary to successively confine elongated but otherwise incremental length of the blade in a narrow, non-abrasive guide channel, in order to apply the resultant inward force which temporarily rigidifies the incremental lengths by engaging the resilient material in the guide channel.

Figure 1:
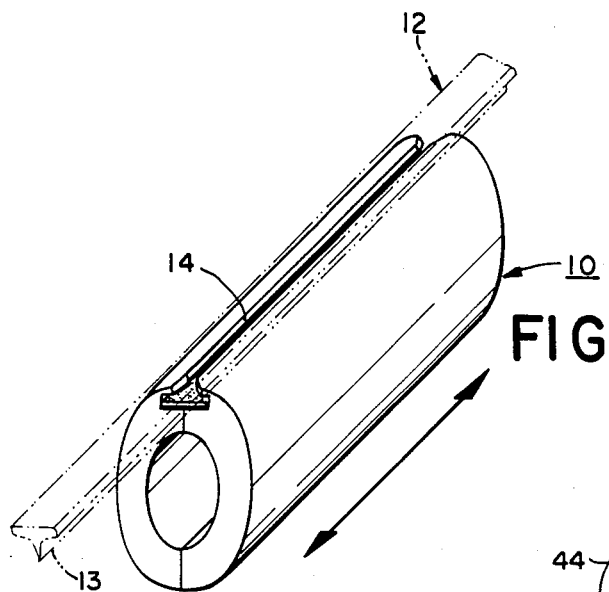
FIG. 1 is a front perspective view of an apparatus according to the invention, a windshield wiper blade being illustrated in phantom, in operable engagement with the apparatus of the invention.

An apparatus useful for practicing the invention is illustrated in FIG. 1 and generally designated 10. Apparatus 10 is designed particularly for refurbishing the working edges of windshield wiper blades, such as those used on various vehicles. It will be appreciated that the invention is likewise applicable to resilient blades designed for other uses, provided they are adapted for transverse motion with respect to the plane of the blade, that is, for wiping motion.

Windshield wiper blade 12, as shown in FIG. 1, has a working edge 13 directed perpendicularly downward into a guide channel 14, of substantially the same width as the working edge. Apparatus 10 is then moved smoothly along the working edge of the blade, that is, in the direction shown by the double-headed arrow in FIG. 1.

With reference to FIGS. 1 and 3, the apparatus 10 may comprise an elongated handle member having a substantially oval cross-section, defining at least one rounded longitudinal edge. An elongated slot 14 is provided with a cross-section substantially like that of an inverted "T". Slot 14, therefore, comprises a first slot portion 16, extending downwardly from the surface of the elongated handle member, and second slot portion 18, extending laterally from the bottom of first portion 16, and adapted to support abrasive material 20. Portion 16 is preferably only as wide as absolutely necessary to permit movement of the blade in the slot, preferably subtantially the same width as the working edge of the blade itself. Therefore, the user must lightly force the blade 12 into slot 16 in order to initially contact the abrasive. Working edge 13 is then directed perpendicularly down against abrasive member 20, supported by the walls of the slot, and material is removed only from the working edge upwards along the plane of the blade.

In order to facilitate insertion of the wiper blade into the slot 14, and in order to ease movement thereof without detracting from the rigidifying characteristics of the channel formed by the walls 15, 17 of slot 16, the slot may be dimensioned such that walls 15 and 17 diverge at a very slight angle, for example, 5° off perpendicular. It will be appreciated that the walls 15, 17 must nevertheless be made non-abrasive and the particular angle of divergence should preferably be substantially less than that of the converging walls of blade 12 towards working edge 13. To further assist in insertion of the working edge of the wiper blade, the extreme edges of slot 14 are provided with angled corner portions 22.

The bottom surface of slot portion 18 forms a receiving surface for abrasive member 20, which has an upwardly-directed abrasive surface. In connection with the typical materials from which windshield wiper blades are formed, it is presently preferred that the abrasive member be an emery board of approximately 150 grade. Inasmuch as material is to be removed rather than the surface merely smoothed, one might assume a coarse grade preferable. Nevertheless, in comparison to mere roughening devices, there is substantially less work required to reach a smooth device at even the fine grade of abrasive disclosed, because the abrasion is confined to the relatively narrow working edge, and is not applied to the larger surfaces of the converging sides of blade 12. The finished blade is smoother as well. It will also be appreciated that the most effective grade of abrasive will depend upon the particular wiper blade being refurbished, large coarse wiping apparatus being effectively refurbished using coarser abrasive and precision light-weight apparatus requiring finer abrasive.

Figure 3B:
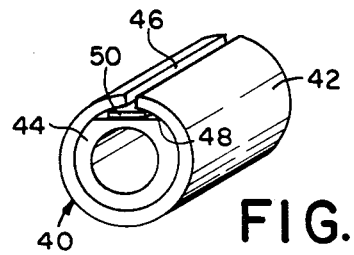
FIG. 3(b) is a perspective view illustrating the structure of an alternative embodiment.
Figure 2:
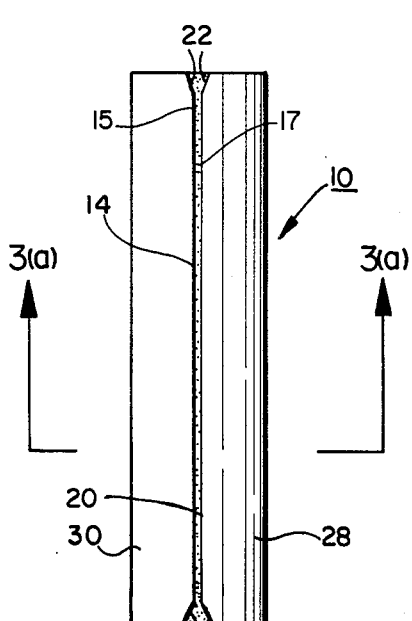
FIG. 2 is a top plan view of the apparatus shown in FIG. 1, but without the windshield wiper blade shown in phantom.
Figure 3A:
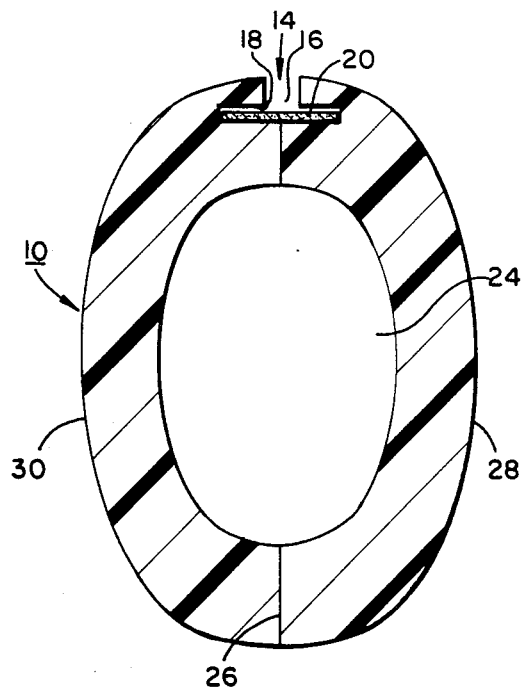
FIG. 3(a) is an enlarged section view taken along the line 3—3 in FIG. 2.

As shown sectionally in FIGS. 3(a) and 3(b), the elongated handle member can be formed from right and left halves 28, 30, joined at a seam 26. Each half is semi-annular in cross-section, forming an oval shape. The oval shape is preferred over circular, in that such shape allows the user to manually sense the alignment of the apparatus with the blade, more easily maintaining alignment without undue force against one side of the blade or the other. The device will admit of some misalignment because downward force on the blade causes an inward force of the sides of the channel, tending to center the blade and thereby offset uneven force up to a point. The device may therefore be made circular in external contour, as shown in FIG. 3(b); however, the oval cross-section of FIG. 3(a) is preferred.

In the construction shown in FIG. 3(a), the abrasive material is inserted in the transverse slot at the bottom of groove 14. Preferably, the separately formed halves 28, 30 are glued together around an abrasive portion, which portion is also glued. The abrasive member 20 can also be made removable, for example, being slipped in longitudinally from one end.

An alternative arrangement is illustrated in FIG. 3(b). In this embodiment, the housing 40 comprises an external portion 42 and an internal portion 44. External portion 42 is longitudinally slotted at opening 46. In order to position abrasive 50 immediately below and perpendicular to opening 46, a flattened area 48 is formed on inner portion 44, to which the abrasive 50 is affixed.

The embodiment of FIG. 3(b) may be adapted to resiliently engage the abrasive member 50 in position. Outer member 42 may be merely slotted and slot 46 formed by forcing outer member 42 open due to insertion of inner member 44. In this manner, abrasive member 50 is resiliently engaged between the inner and outer members.

Figure 4:
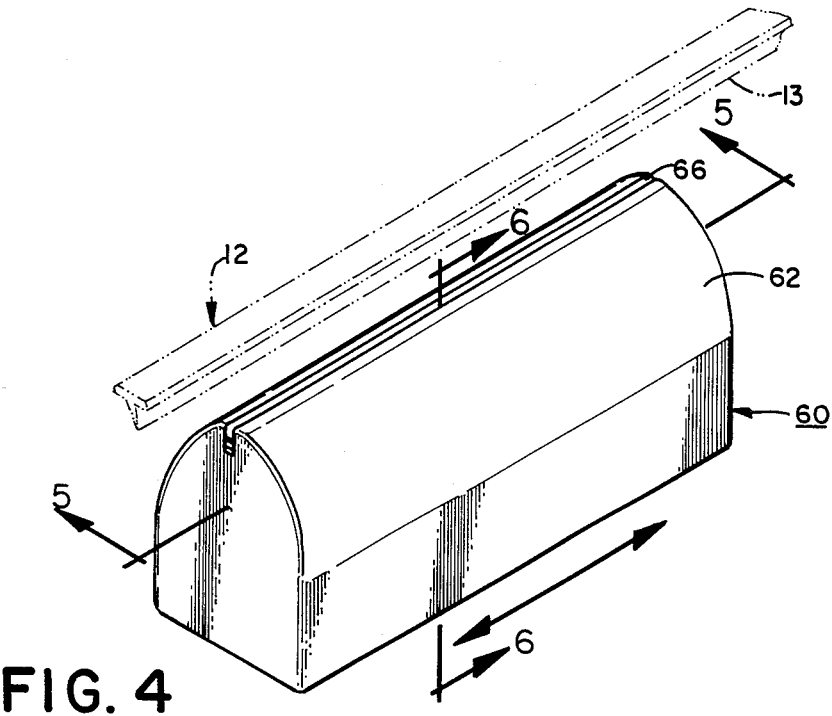
FIG. 4 is a perspective view of a further alternative embodiment of the invention.
Figure 5:
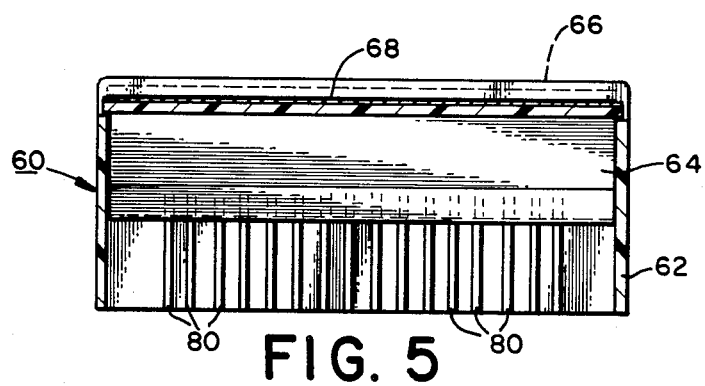
FIG. 5 is a section view taken along lines 5—5 in FIG. 4.
Figure 6:
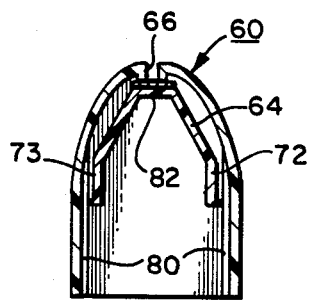
FIG. 6 is a section view taken along lines 6—6 in FIG. 4.

The preferred embodiment of the invention is illustrated in FIGS. 4-6. Apparatus 60 comprises a rounded longitudinal side terminating in slot 66, which slot engages the working edge of wiper blade 12, applying the inward rigidifying force necessary to align the tool and blade. Unlike the previous embodiments, the underside of apparatus 60 is hollow. Apparatus 60, as shown in FIGS. 5 and 6, comprises an outer member 62 and an inner member 64, the inner member 64 tending to support abrasive material 68 immediately below slot 66. As in the previous embodiments, the abrasive material extends past the edges of the slot or channel and along the entire length thereof.

The abrasive material may be glued to the upper flat portion 82 of inner member 64, or may be merely placed thereon and held between members 62, 64 against the underside of outer member 62, immediately adjacent slot 66. Inner member 64 may be made removable from the hollow of outer member 62, for changing abrasive material 68. In any event, means must be provided to engage inner member 64 within the hollow of outer member 62.

Inner member 64 is slightly larger than the hollow of outer member 62, such that the inner member is resiliently deformed upon insertion and is held in place by pressure between members 62, 64. A series of ridges 80 is preferably provided on the inner surface of the outer portion 62 of apparatus 60. These ridges may be aligned parallel to the direction of insertion, as shown in FIGS. 5 and 6, whereby inner portion 64 may be inserted as far as possible. The entire device (with the exception of the abrasive portion) is preferably formed of a slightly malleable plastic, whereby the downwardly extending legs 72, 73 of the substantially U-shaped inner portion 64 tend to dig into the ridges 80, securely but removably attaching the inner and outer portions 64, 62.

Should ridges 80 be aligned parallel to the slot 66, rather than perpendicular thereto, inner portion 64 would be less easily removed, and would be necessarily set to the precise spacing of one of the ridges. Accordingly, it is presently preferred that the pictured alignment, namely, perpendicular to slot 66, be employed for ridges 80.

It will be appreciated that the preferred dimensions of the apparatus will depend upon the particular windshield wiper blade or the like being refurbished. For purposes of comparison, it has been found that the usual automobile windshield wiper blade can be effectively refurbished using an elongated handle member of at least 3.5 inches length, the rounded cross-section being a portion of an oval having a major axis of about 1.25 inches and a minor axis of about 0.875 inches. In such a device, the slot portion may be about 0.06 inches in width and 0.1 inches depth. As noted above, the material employed for use in the embodiment of FIGS. 4-6 should be sufficiently malleable to accomplish the engagement between legs 72, 73 and ridges 80. Recommended materials include polypropylene, nylon, phenolic, aluminum, wood and others.

Most windshield wiper blade nicks and cuts can be refurbished by removal of 0.001 to 0.010 inches of material. Therefore, given the need to force the resilient blade into the slot in order to temporarily rigidify successive portions, a given windshield wiper blade can be refurbished from two to four times, albeit with increasing difficulty.

The invention having been disclosed, further embodiments and variations will now become apparent to persons skilled in the art. Reference should be made to the appended claims rather than the foregoing specification as indicating the true scope of the invention.

What is claimed is:

1. An edger for manually refurbishing a wiper blade of elastomeric material, the wiper blade having a cross-section of decreasing width toward a working edge, the blade adapted to be wiped transversely over a surface, the edger comprising:

an elongated housing to be grasped by a user, the housing being at least partly hollow and having an external portion with at least one groove along its entire length, the groove having rigid, non-abrasive side walls, the groove having a width substantially the same as the working edge of said blade;

the housing having an internal portion received within the external portion, the internal portion having a surface disposed immediately below the groove, the internal portion being dimensioned to fit tightly into the external portion through a transverse opening extending along the external portion at a side of the housing opposite the groove;

an abrasive member disposed in the housing below the groove, the abrasive member being wider than the groove and fixed in place on said surface disposed immediately below the groove, the abrasive member extending along the length of the housing, the abrasive member being aligned to remove material transverse and perpendicular to the blade as the edger is passed along the working edge, the groove maintaining a blade position perpendicular to the groove,; and, the external portion and the internal portion both being substantially U-shaped in cross-section, each U-shaped portion having legs and a base, the base of the internal portion being flattened and supporting the abrasive member immediately below the groove, the external portion having interengaging press-fit means for engaging the internal portion, the groove being formed along the length of the base of the external portion and the abrasive member being affixed between the base of the internal portion and the base of the external portion, the external portion being engaged by ends of opposite legs of the U-shaped internal portion, the ends of the legs being frictionally disposed against inward sides of the U-shaped portion.

2. The apparatus of claim 1, wherein the inward sides of the legs of the external portion have ridges, the ridges engaging the legs of the internal portion.

3. The apparatus of claim 2, wherein the ridges are aligned perpendicular to the groove.

* * * * *